United States Patent
Hermle

(10) Patent No.: US 8,179,266 B2
(45) Date of Patent: May 15, 2012

(54) SENSOR WITH RFID DATA CARRIER

(75) Inventor: Rolf Hermle, Nuertingen (Hardt) (DE)

(73) Assignee: BALLUFF GmbH, Neuhausen (DE)

( * ) Notice: Subject to any disclaimer, the term of this patent is extended or adjusted under 35 U.S.C. 154(b) by 291 days.

(21) Appl. No.: 12/319,468

(22) Filed: Jan. 7, 2009

(65) Prior Publication Data

US 2009/0189738 A1  Jul. 30, 2009

(30) Foreign Application Priority Data

Jan. 29, 2008  (DE) .................... 10 2008 008 072

(51) Int. Cl.
*G08B 13/14* (2006.01)
(52) U.S. Cl. .................... 340/572.8; 340/447
(58) Field of Classification Search ............... 340/572.8, 340/10.41, 447
See application file for complete search history.

(56) References Cited

U.S. PATENT DOCUMENTS 5,562,787 A * 10/1996 Koch et al. .................. 156/64
5,731,754 A * 3/1998 Lee et al. ..................... 340/447
7,561,048 B2 * 7/2009 Yushkov et al. ........... 340/572.1

OTHER PUBLICATIONS

Euro ID 2007 Workshop, RFID anwendungen mit komplexen Zusatzfunktionen, May 8, 2007, 13 pages.
Melexis: Hall-effect Position Sensors | Sensorless BLDC Motor Drivers, MLX90129 Data Sheet (and related pages), [retrieved on Feb. 19, 2010], 31 pages, <URL: http:// www.melexis.com/Assets/ MLX90129_DataSheet 5193.aspx> (date unknown).

* cited by examiner

*Primary Examiner* — John A Tweel, Jr.
(74) *Attorney, Agent, or Firm* — Lipsitz & McAllister, LLC

(57) ABSTRACT

In order to provide a sensor that is employable in an advantageous manner and which comprises at least one sensitive element and a housing within which the at least one sensitive element is arranged, it is proposed that at least one RFID data carrier be arranged below a surface of the housing, said data carrier storing sensor properties in a non-volatile manner and being adapted to be read out in a non-contact making manner.

14 Claims, 1 Drawing Sheet

SENSOR WITH RFID DATA CARRIER

The present disclosure relates to the subject matter disclosed in German application number 10 2008 008 072.1 of Jan. 29, 2008, which is incorporated herein by reference in its entirety and for all purposes.

BACKGROUND OF THE INVENTION

The invention relates to a sensor comprising at least one sensitive element and a housing within which the at least one sensitive element is arranged.

SUMMARY OF THE INVENTION

In accordance with the present invention, a sensor is provided, which is usable in an advantageous manner.

In accordance with an embodiment of the invention, in the sensor at least one RFID data carrier is arranged below a surface of the housing, said data carrier storing properties of the sensor in non-volatile manner and being adapted to be read-out in non-contact making manner.

Due to the provision of an RFID data carrier which is designed in particular as a transponder, certain items of data particular to the sensor such as data relating to the type thereof for example can be read out even if the surface of the sensor carrying an identification plate or an inscription is so dirt encrusted that the data thereon can no longer be read off. Furthermore, the facility to read out the data in non-contact making manner is provided so that faster and more certain (and in particular, automated) recognition of the data is possible.

Furthermore, the at least one RFID data carrier can be decoupled from the sensor's electronic system and the sensor's electrical connection system.

It is thereby then possible to read out data even if, for example, the electrical connections are interrupted or faulty or, in general terms, if the interface of the sensor with the environment is malfunctioning. For example, an emergency channel can be implemented over which data relating to the nature of the fault in the sensor such as major damage or a break in a cable for example can be read out.

If the at least one RFID data carrier is adapted to be written to, then it is also possible to program and/or configure the sensor via said RFID data carrier, whereby the sensor itself does not necessarily have to be supplied with energy. It is also possible to effect such a programming and/or configuration process and also to read out information externally of its particular usage and, for example, far away from the point where it is being used.

Maintenance procedures can be carried out in dependence on the history of the sensor, i.e. the state of the sensor can be taken into account for or during the maintenance process on the basis of the conditions to which the sensor has been subjected in the past. For example, it is possible to store the passive working time of the sensor and the operational hours when it is in active use and then to utilise this information for the evaluation process. Furthermore for example, it is possible to differentiate between active operation of the sensor and non-active operation wherein the sensor is not supplied with energy or is being operated in standby mode. Testing and calibration of the sensor can then be effected at such a time point for example.

Furthermore, the stock management of such sensors can be simplified. Stock movements can be monitored and registered by the dialogue with the at least one RFID data carrier.

With the aid of the at least one RFID data carrier, it is also possible to read-out sensor data such as measuring data or to carry out a safety check or execute a diagnostic process.

Furthermore, it is possible to generate an alarm if, for example, site conditions do not correlate with the sensor specification.

It is also possible to store environmentally relevant characteristic data or material data on the at least one RFID data carrier in order to enable a sensor to be disposed of later in an environmentally correct manner.

The sensor in accordance with the invention is in particular an optical sensor, an inductive sensor, a capacitive sensor or an ultrasonic sensor which detects the presence or absence of an object in quantitative or qualitative manner. For example, the sensor may be in the form of a probe which tests as to whether an object has entered a measuring field (which, in particular, is a light field). It is also possible for the sensor to be in the form of a ranging sensor, a proximity sensor or a position sensor which determines the distance or the position of an object relative to the sensor in absolute terms or produces a switching signal.

Due to the solution in accordance with the invention, a sensor having properties which can be determined in a simple manner can be made available in a simple manner. Furthermore, the transmitting characteristics and/or receiving characteristics of the at least one RFID data carrier can be used for reading out sensor data in non-contact making manner in order to form an emergency channel for example. It is possible to couple signals internally into the sensor via the at least one RFID data carrier in order to carry out a safety check for example.

It is advantageous if the at least one RFID data carrier is adapted to be written to in non-contact making manner. Thus, further data such as maintenance data and test data for example can also be stored during the "life" of the sensor. The write capability of the at least one RFID data carrier can also be used for supplying stimulation signals to the sensor, these signals then being processed internally in the sensor. Thus for example, a remotely triggered diagnostic process can be carried out; for example, stimulation signals are transmitted, this then leading to testing of the sensor functions. It is possible to conduct a safety check using stimulation signals which are transmitted to the at least one RFID data carrier.

In particular, the housing is formed in such a manner and/or the at least one RFID data carrier is arranged and formed in such a manner that the at least one RFID data carrier is readable and/or adapted to be written to by a reading/writing device located outside the housing. Thus, the corresponding data relating to the sensor properties can then be read out even if, for example, a surface of the housing is dirty. Furthermore, simple and in particular automated data read out and data writing processes are possible.

It is possible for example, for the at least one RFID data carrier to be seated in a recess in the housing, which recess is closed to the exterior. In the case of one easily producible embodiment, the at least one RFID data carrier is arranged within the housing. It can thereby be positioned as an integral part of the manufacturing process for the sensor.

It is particularly advantageous if the at least one RFID data carrier stores at least one of the following items of data: data concerning the type of sensor, fixed settings of the sensor, programmable settings of the sensor, servicing data and/or maintenance data for the sensor, test data relating to the sensor, manufacturing data, life history of the sensor, operational data of the sensor. The corresponding items of data are integrated into the sensor and retained therein. If a sensor then has to be replaced for example, then its settings can be rapidly and securely determined in order to enable the replacement sensor to be selected or adjusted accordingly. Maintenance data or servicing data can vouch for the "history" of the sensor and prove that appropriate maintenance or testing has been effected. Such servicing data and maintenance data are, for example, items of data concerning the cleaning of an optical device in an optical sensor or data concerning the adjustment or alignment of a sensor. Due to the embedded storage of such data in the sensor, protection can be obtained in relation to plagiarism for example. Sensor parameters such as its switching gap, NO/NC etc. can be read out in a simple manner. The type, the variant and the design or version of the sensor can be determined externally in a simple manner, and, in like manner, the serial number. The life history can be determined in a simple manner in order to adhere to a maintenance schedule dependent on the life history for example.

It is expedient if the at least one RFID data carrier is adapted to be read out and/or be written to by means of electromagnetic waves. Advantageously, the RFID data carrier is in the form of a transponder, whereby the energy, which is needed for the processes of reading and writing to the sensor, originates from the electromagnetic field of a reading/writing device. The at least one RFID data carrier can thereby be completely decoupled from other components of the sensor in regards to the data exchange process.

In particular, the electromagnetic waves lie in a technically high frequency range. Secure reading and writing processes can thereby be realized. Appropriate RFID data carriers are commercially available.

It is expedient if a read/write frequency lies in an ISM band. ISM bands (industrial, scientific and medical band) define frequency ranges which can be used by high frequency devices for which general authorisation is sufficient.

For example, a read/write frequency lies in the UHF range. The UHF frequency range lies between 860 MHz and 960 MHz.

In one exemplary embodiment, a read/write frequency is at 13.56 MHz and/or 125 kHz.

It is especially very advantageous if the at least one RFID data carrier is adapted to be read out and/or written to without using a connector of the sensor. Thus, the corresponding sensor properties can still be read out even if the connector has failed.

It is especially very advantageous if the at least one RFID data carrier has a power supply which is independent of the power supply for the sensor. In particular, the power supply for the RFID data carrier is provided by a write field or a read out field of a transmitter/receiver. It is thereby possible to read-out data from the sensor even if the latter is not being supplied with energy. Furthermore, it is in principle possible to program, to configure or to calibrate the sensor even if it is not being supplied with energy. Extensive possibilities for the application of the arrangement thereby result.

It is especially very advantageous if an emergency channel for the read out of data is formed by means of the at least one RFID data carrier. For example, it is possible that sensor data can no longer be read out over the cable connections after damage has occurred or as a result of a break in the cable etc. If the relevant sensor data has been made available prior to the event, then it can be read out in non-contact making manner via the at least one RFID data carrier which is in principle formed such as to be independent of the other functions of the sensor.

It is then particularly advantageous if there is provided an interface device which is integrated into the sensor and via which items of data in the sensor are adapted to be provided to the at least one RFID data carrier and/or signals are adapted to be provided internally to the sensor by the RFID data carrier. The interface device caters for the data communication process between electronic circuitry in the sensor and the at least one RFID data carrier.

For example, it is thereby possible to read out sensor data in non-contact making manner if it has been made available to the at least one RFID data carrier via the interface device. Thus for example, an emergency channel can be realized for the read out of data in the event of a break-down. It is also possible for example for a warning signal to be emitted via the at least one RFID data carrier if quality-relevant parameters have been exceeded. Furthermore, it is also possible to internally access the sensor via the at least one RFID data carrier in that appropriate signals are transmitted internally to the sensor. For example, the at least one RFID data carrier is subjected to an external stimulation signal which is made available to the sensor internally via the interface device and triggers a safety check therein. A remotely triggered diagnosis of the sensor can also be carried out in this manner. Sensor functions such as the main function of the sensor and protective functions for example can be checked.

Programming signals and/or parametric signals can be made available via the at least one RFID data carrier serving as an antenna for the external communication process between the sensor and its surroundings. The sensor can thereby be programmed or configured.

It is also possible for the signals that are made available to the sensor to comprise stimulation signals for sensor interrogation and/or triggering diagnostic processes in the sensor. Thus, a process of testing the sensor can be initiated externally without needing to have recourse to the normal connections to the sensor.

It is also possible for the sensor data which is made available to the at least one RFID data carrier to comprise warning signals. If, for example, a diagnostic function of the sensor detects a fault, then this can be passed to the at least one RFID data carrier via the interface device for the purposes of external transmission. This can be effected in addition to the delivery of a warning signal via a normal connection.

It is in principle also possible for the sensor data to comprise measuring data. Thus for example, the most recently determined measuring data can still be read out even when there is a fault in the sensor.

It is then particularly advantageous if a storage device is associated with the interface device. For example, the storage device stores measuring data at least temporarily in order to enable this measuring data to be read-out out via the at least one RFID data carrier should a sensor fault be detected.

The following description of preferred embodiments serves for a more detailed explanation of the invention taken in conjunction with the drawings.

DETAILED DESCRIPTION OF THE INVENTION

Figure 1:
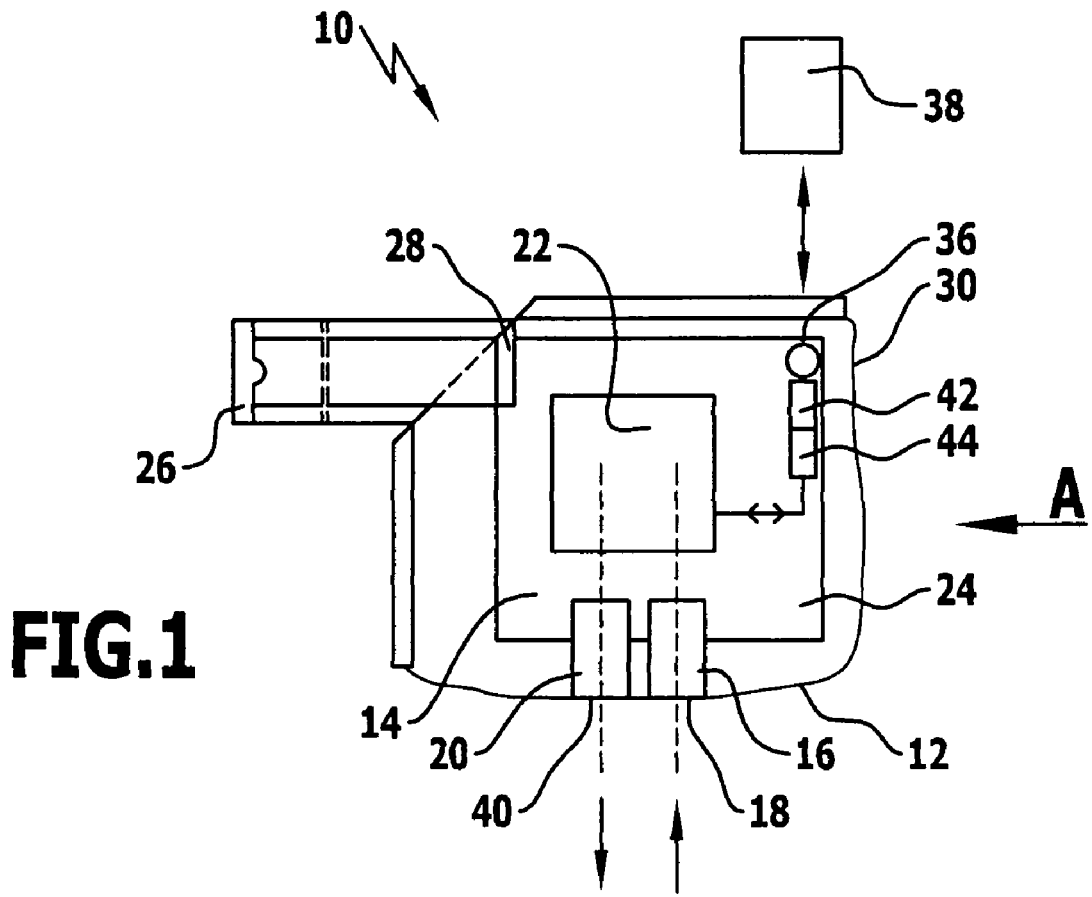
FIG. 1 shows a schematic sectional view of an exemplary embodiment of a sensor in accordance with the invention.

An exemplary embodiment of a sensor in accordance with the invention, which is shown schematically in FIG. 1 and bears the reference 10 therein, comprises a housing 12 together with the interior 14 of the housing. The housing 12 is made of a metallic material or a carbon material for example.

At least one sensitive element 16 is arranged at least partially in the interior 14 of the housing. This sensitive element 16 serves for the detection of one or more physical quantities.

A window 18 for the sensitive element 16 can be arranged in the housing 12. The window 18 enables a signal to be applied to the sensitive element 16. In this exemplary case of an optical sensor 10 wherein the sensitive element 16 detects electromagnetic radiation within the optical range, the window 18 is transparent to light of the corresponding wavelength.

Provision may be made for the sensor 10 to comprise a transmitter 20 which emits electromagnetic radiation that is then reflected for example, and the reflected radiation is adapted to be detected by the sensitive element 16.

In dependence on the embodiment, the sensitive element 16 and the transmitter 20 can thereby form an integral combination (in the case of a capacitive sensor or an inductive sensor for example).

An evaluating device 22, which carries out at least a partial evaluation process, is arranged in the interior 14 of the housing. The evaluating device 22 comprises one or more IC components and/or one or more discrete electronic components for example.

The evaluating device 22 is arranged on one or more carriers 24 for example. Thereby, a carrier 24 can be in the form of a circuit board for example. It is likewise possible hereby, for the sensitive element 16 and the transmitter 20 to be held on the carrier 24.

The sensor 10 comprises a connector 26 to which a plug is connectable or to which a cable is attached. The sensor 10 can be supplied with electrical energy and sensor signals can be fed out via the cable or the plug. Control signals can be coupled in should this be necessary.

A coupling element 28, which is effectively connected electrically to the connector 26, is arranged on the carrier 24. Electrical energy can be supplied to the evaluating device 22 and the transmitter 20 and also to the sensitive element 16 via the coupling element 28. Furthermore, signals can be fed out from the evaluating device 22 via the coupling element 28.

Figure 2:
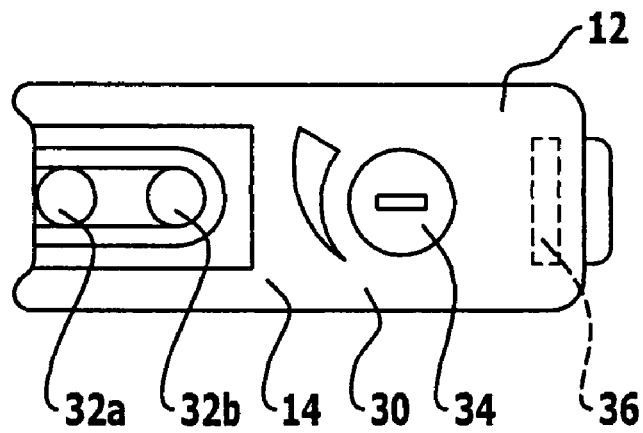
FIG. 2 a view of the sensor in accordance with FIG. 1 in the direction A.

One or more optical display elements 32a, 32b such as light emitting diodes for example can be arranged on one or more sides 30 of the housing (FIG. 2). These elements indicate the functionality or the operation of the sensor 10.

Furthermore for example, a potentiometer 34 can be arranged on one side 30 of the housing in order to enable certain parameters of the sensor to be set.

The sensor 10 comprises (at least) one RFID data carrier 36 which is arranged below a surface of the housing 12 and is thereby protected from external contamination or the like. In particular, the RFID data carrier is arranged in the interior 14 of the housing. For example, it is seated on the carrier 24.

The RFID data carrier 36 is in the form of a transponder which is adapted to be read and written-to in non-contact making manner by a reading/writing device 38. It is in principle possible thereby, for the RFID data carrier 36 to be merely readable but not adapted to be written to, or for it to be such as to be both readable and adapted to be written to.

Data can be stored in non volatile manner on the RFID data carrier 36. The reading and writing processes can be effected externally, i.e. the reading/writing device 38 is positioned outside the housing 12. Furthermore, the reading and writing processes can be effected without recourse to the coupling element 28.

Data characteristic of the sensor 10 is stored in the RFID data carrier 36. Thereby for example, the data relates to data concerning the type of sensor and/or test data in respect of the sensor and/or manufacturing data. Data relating to the settings of the sensor can also be stored. Such settings data may be in the form of fixed settings (which are established during the manufacture of the sensor for example) or programmable settings of the sensor.

For example, in the case where the sensor is in the form of a switch, the data stored on the RFID data carrier indicates whether it is a normally-closed or a normally-open switch. Furthermore for example, the settings for an analogue output characteristic can also be stored on the RFID data carrier.

In the case of an optical sensor for example, one can store maintenance data such as data regarding the cleaning of an optical member and in particular the window 18 and/or a window 40 which is associated with the transmitter 20.

Maintenance data concerning readjustments and/or alignment of the sensor 10 for example can also be stored in the RFID data carrier.

Due to the RFID data carrier 36, data relating to the sensor 10 can be stored in non volatile manner, such data being adapted to be read-out externally in non-contact making manner even if its identification plate or an inscription relating to the sensor 10 on the surface of the housing is no longer readable in a dirty environment for example. Furthermore, independence from the coupling element 28 and also the evaluating device 22 is realized by virtue of the RFID data carrier; the RFID data carrier 36 is readable and adapted to be written without recourse to other components of the sensor 10. The ability to read data is thereby possible even in the event of failure of the sensor and in particular too, when communications via the connector 26 or the coupling element 28 are disrupted.

Due to the construction of the RFID data carrier 36 in the form of a transponder, it is also not dependent on the power supply for the sensor 10, but rather, the energy needed for the purposes of reading and writing data is supplied by the electromagnetic field of the reading/writing device 38.

One or more of the frequencies with which the RFID data carrier 36 is adapted to be read or written-to lie in the technically high frequency range. For example, one suitable frequency is 13.56 MHz or 125 kHz.

It is also possible for one or more appropriate frequencies to lie in a UHF range, i.e. in the frequency range between 860 MHz and 960 MHz (in Europe, the UHF range lies between 865 MHz and 868 MHz, whereas in the USA it lies between 902 MHz and 928 MHz and in Asia it lies between 950 MHz and 960 MHz).

It is expedient thereby if the appropriate frequency or frequencies lie in an ISM band. The employment thereof is thereby simplified.

The sensor 10 can be in the form of an optical sensor which detects optical signals. It may also detect other electromagnetic signals. For example, it is in the form of an inductive sensor or a capacitive sensor. Further possibilities, such as being constructed as an ultrasonic sensor, a microwave sensor etc. are also possible. For example, the sensor could also be in the form of a magnetostrictive position measuring sensor.

The sensor 10 may also be in the form of an optical probe for example.

It can be in the form of a range sensor or non-contact making switch or a proximity sensor or a proximity switch. It can determine positions or paths in absolute terms or detect switching positions.

It is in principle possible for the (at least one) RFID data carrier 36 to be independent of the electronic circuitry of the sensor.

In one exemplary embodiment, the sensor 10 comprises an interface device 42. Communications between the at least one RFID data carrier 36 and the evaluating device 22 via this interface device 42 are possible. Thereby, the communication process can be unidirectional or bi-directional.

A storage device 44 for the storage of data and in particular, for buffering data, and especially sensor data can be associated with the interface device 42.

If the interface device 42 is bi-directional, data can be supplied from the RFID data carrier 36 to the evaluating device 22 via said interface device. Thereby for example, remotely controlled (wireless) programming or configuration of the sensor 10 is possible. For example, parameters of the sensor can then be changed via the RFID data carrier 36 serving as a wireless connector.

It is also possible for example, to couple stimulation signals via the RFID data carrier 36 so as to enable a safety check to be carried out on the evaluating device 22 or to carry out a remotely triggered diagnostic process; sensor functions can thereby be checked.

In the case of a bi-directional arrangement of the interface device 42, then sensor data can also be transmitted to the exterior via the RFID data carrier 36. An emergency channel for example can thus be realized, and sensor data (such as measuring data for example) can be read out via this channel in the event of damage or a break in a cable for example. This sensor data may have been previously buffered in the storage device 44. For example, provision is made for the evaluating device 22 to write the corresponding measuring data into the storage device 44. In an emergency, the interface device 42 can read-out the data stored in the storage device 44 and transmit it to the exterior via the RFID data carrier 36.

It is also possible thereby for example, for a warning signal to be produced internally in the sensor 10 by the evaluating device 22 and for this to be transmitted via the interface device 42 to the RFID data carrier 36 and then sent out. Thus, a warning signal can be emitted by the sensor 10 if, for example, site conditions (which are adapted to be written-in by the RFID data carrier 36) do not meet the specification for the sensor 10 (whereby the specification data can be stored on the RFID data carrier 36).

The invention claimed is:
1. A sensor comprising:
at least one sensitive element; and
a housing within which the at least one sensitive element is arranged;
wherein:
at least one RFID data carrier is arranged below a surface of the housing, said data carrier storing sensor properties in a non-volatile manner and being adapted to be read-out in a non-contact making manner;
the at least one RFID data carrier stores at least one of: data relating to a type of sensor, fixed settings of the sensor, programmable settings of the sensor, at least one of servicing data and maintenance data for the sensor, test data of the sensor, manufacturing data, life history of the sensor, and operational data of the sensor;
the at least one RFID data carrier is adapted to be written-to in a non-contact making manner;
the at least one RFID data carrier is adapted to be at least one of read-out and written-to by means of electromagnetic waves;
the at least one RFID data carrier is independent of a power supply for the sensor; and
the at least one RFID data carrier is adapted to be powered by the electromagnetic waves.

2. A sensor in accordance with claim 1, wherein at least one of (i) the housing is formed in such a manner and (ii) the at least one RFID data carrier is arranged and formed in such a manner that the at least one RFID data carrier is adapted to be at least one of read and written-to by a reading/writing device located outside the housing.

3. A sensor in accordance with claim 1, wherein the at least one RFID data carrier is arranged within the housing.

4. A sensor in accordance with claim 1, wherein the electromagnetic waves have a frequency within a technically high frequency range.

5. A sensor in accordance with claim 1, wherein a read/write frequency lies in an ISM band.

6. A sensor in accordance with claim 1, wherein a read/write frequency lies in the UHF range.

7. A sensor in accordance with claim 1, wherein a read/write frequency is at 13.56 MHz and/or 125 kHz.

8. A sensor in accordance with claim 1, wherein an emergency channel is formed for the process of reading out data by means of the at least one RFID data carrier.

9. A sensor in accordance with claim 1, comprising an interface device which is integrated into the sensor and by which at least one of (i) items of sensor data are adapted to be provided to the at least one RFID data carrier and (ii) signals are adapted to be provided internally to the sensor by the at least one RFID data carrier.

10. A sensor in accordance with claim 9, wherein the signals provided to the sensor comprise at least one of programming signals and parametric signals.

11. A sensor in accordance with claim 9, wherein the signals provided to the sensor comprise stimulation signals for at least one of sensor interrogation and triggering diagnostic processes in the sensor.

12. A sensor in accordance with claim 9, wherein the items of sensor data comprise warning signals.

13. A sensor in accordance with claim 9, wherein the items of sensor data comprise measuring data.

14. A sensor in accordance with claim 9, wherein a storage device is associated with the interface device.

\* \* \* \* \*